Sept. 3, 1946.  C. S. GRIMSHAW  2,406,828
OPTICAL SIGHTING APPARATUS
Filed May 15, 1942  2 Sheets-Sheet 1
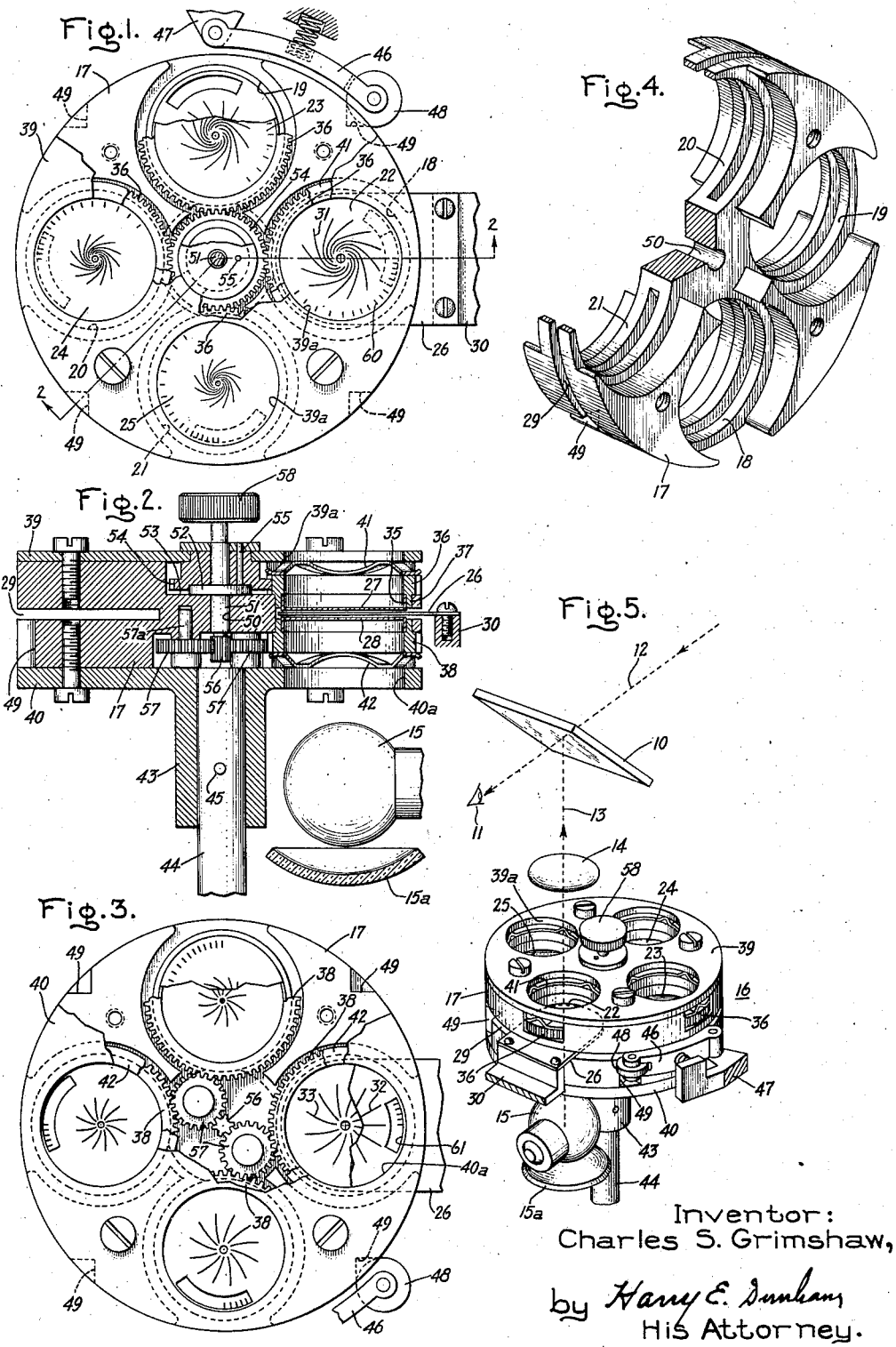
Inventor:
Charles S. Grimshaw,
by Harry E. Dunham
His Attorney.

Sept. 3, 1946.   C. S. GRIMSHAW   2,406,828
OPTICAL SIGHTING APPARATUS
Filed May 15, 1942   2 Sheets-Sheet 2
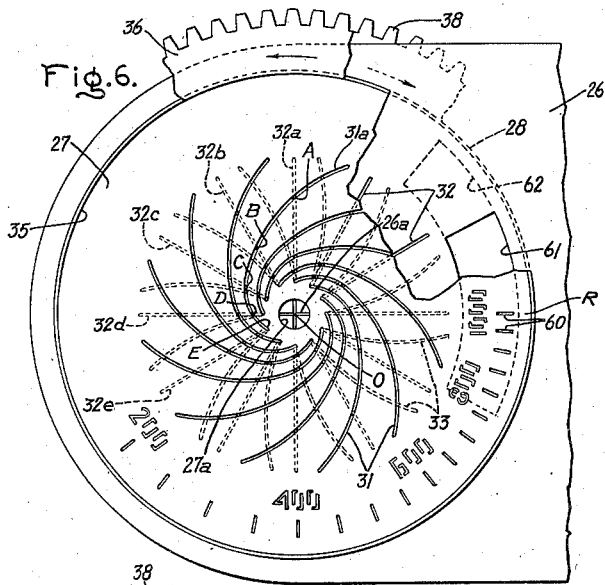
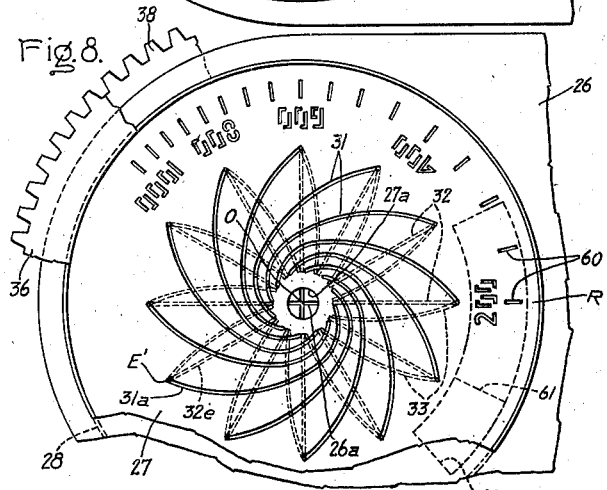
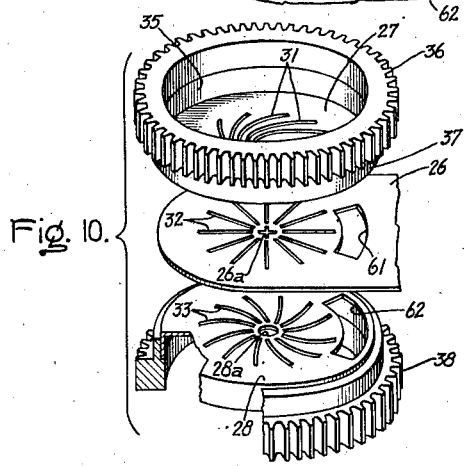
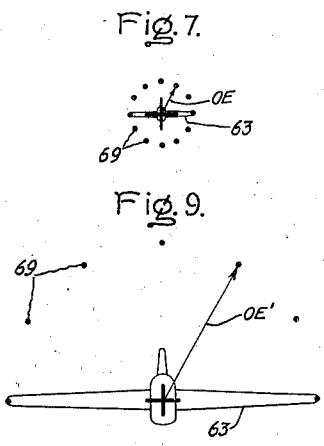
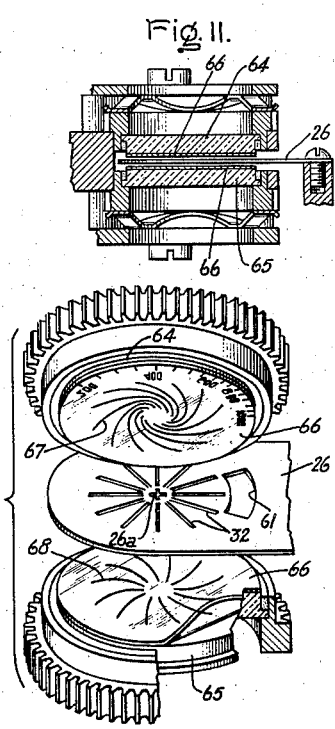
Inventor:
Charles S. Grimshaw,
by Harry E. Dunham
His Attorney.

Patented Sept. 3, 1946

2,406,828

UNITED STATES PATENT OFFICE 2,406,828

OPTICAL SIGHTING APPARATUS

Charles S. Grimshaw, Scotia, N. Y., assignor to General Electric Company, a corporation of New York Application May 15, 1942, Serial No. 443,031

14 Claims. (Cl. 88—2.3)

The present invention relates to optical sighting apparatus and more particularly to optical sighting apparatus having particular utility as a stadia range finder.

Stadia range finders operate on the principle that the range of a distant target whose actual size is known may be determined by a measurement of the angle the target subtends at the eye of the observer. The subtended angle is usually measured by superimposing upon the line of sight of the observer an image of a stadia figure the size of which may be adjusted to coincide with a known dimension of the observed target. When coincidence is obtained the size of the stadia figure bears a fixed relation to the subtended angle and target range, and hence adjustable means for varying the size of the stadia figure can be calibrated in terms of target range.

Stadia range finders have been found to be particularly well suited for determining the range of a fast moving target, such as an aircraft, as observed from another aircraft. Such range measurement is used in connection with gun directing apparatus for directing a gun carried on an aircraft, such as a machine gun. Such stadia range finders usually comprise a transparent member through which a target is observed. A collimating light projecting system is provided which projects an image of a stadia figure so that it is reflected from the transparent member into the observer's line of sight where it appears as a virtual image at an infinite distance and coincident with the observed target.

Because aircraft are maneuvered to a great extent, particularly in battle, it will be appreciated that the known dimensions of the target, on the basis of which the stadia figure is calibrated, such as for example the wing-span, may be observed in the line of sight at almost any angle with reference to the stadia figure. It is therefore desirable that the stadia figure of adjustable size be approximately in the form of a circle.

It has been proposed heretofore to utilize an iris diaphragm as an adjustable stadia figure so that the image of the variable diaphragm opening is projected into the line of sight and adjusted to encompass the observed target. This arrangement has the disadvantage that during observation of a target when the general light intensity is very low, such as at night, light passing through the diaphragm opening and reflecting into the line of sight renders the target wholly or at least partially invisible since the reflected light covers the field of view in which the target is observed. It is accordingly an object of my invention to provide a stadia range finder in which the image of the stadia figure superimposed upon the line of sight does not interfere to any appreciable extent with observation of the target under low intensity light conditions.

Another object of the present invention is to provide an improved optical sighting apparatus of the type utilizing an adjustable stadia figure.

A further object of my invention is to provide an improved optical range finding apparatus of the stadia type.

Another object is to provide apparatus for projecting the image of an adjustable stadia figure into a line of sight which is simple in construction and highly sensitive in operation.

A further object is to provide a novel means for indicating to the observer a quantity determined by adjustment of the stadia figure in a stadia range finder.

A still further object of the invention is to provide a stadia range finder having an arrangement whereby a selected one of a number of stadia figures calibrated to measure the range of targets of different size can be placed quickly into operative position.

Briefly, according to the present invention, there is provided a transparent member through which a target may be observed and a collimating light projecting system for projecting an image of an adjustable stadia figure on said transparent member so that it is reflected into the line of sight of the observer. The light projecting system comprises a collimating lens, a source of light and a plurality of superimposed opaque masking plates disposed between the source of light and the lens and located substantially in the focal plane of the lens. The masking plates have a series of light conducting portions arranged to produce a luminous stadia figure formed of a plurality of points of light appearing at the intersections of the light conducting portions of the plates. The light conducting portions of the plates have a configuration such that the points of light are arranged in a circle the diameter of which may be varied by a relative rotative movement of the plates. One of the plates is also provided with light conducting portions forming luminous indicia for indicating to the observer a quantity, such as range, which is variable as a function of the size of the stadia figure. A plurality of sets of cooperating masking plates are provided which are calibrated to determine the range of different size targets. These sets of cooperating plates are mounted on a rotary carriage so arranged that the sets of plates may be selectively positioned in operative position with reference to the collimating lens.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 is a top plan view of a stadia range finding device constructed in accordance with my invention; Fig. 2 is an elevation view in section taken along the line 2—2 of Fig. 1 looking in the direction of the arrows; Fig. 3 is a bottom view of the device shown in Fig. 1 partly broken away to show certain details; Fig. 4 is a perspective view partly broken away showing constructional details of the rotary supporting carriage; Fig. 5 is a schematic illustration of an optical sighting system embodying the present invention; Fig. 6 shows the relationship of three superimposed masking plates when adjusted for maximum range; Fig. 7 illustrates the manner in which the stadia figure generated by the plates shown in Fig. 6 appears to the observer; Fig. 8 is similar to Fig. 6 except that the plates are shown as adjusted for minimum range; Fig. 9 is similar to Fig. 7 except that the stadia figure is shown adjusted for minimum range as when the masking plates are in the position shown in Fig. 8; Fig. 10 is an exploded view showing the relationship of one set of cooperating masking plates; Fig. 11 shows a modified form of the invention utilizing a different arrangement of the masking plates; Fig. 12 is an exploded view showing the cooperative relationship of the modified masking plates shown in Fig. 11.

Referring to the drawing, I have shown a stadia range finding apparatus comprising a transparent member 10 (Fig. 5) formed of glass or other suitable material, through which a distant target may be observed by an observer whose eye is positioned at 11. The plane of the transparent member 10 is disposed at an angle to the line of sight 12 so that an image of a range finding stadia figure projected along a line 13 is reflected from the surface of the member 10 into the eye of the observer where it appears as a virtual image superimposed upon the line of sight 12.

For the purpose of projecting an image of a stadia figure into the observer's line of sight, I provide a collimating light projecting system comprising a collimating lens 14, a source of illumination in the form of an electric lamp 15 and its associated reflector 15a, and apparatus comprising an assembly indicated generally at 16 for producing or forming a plurality of stadia figures calibrated to determine the range of different size targets and arranged to be selectively positioned between the lens 14 and the lamp 15 so that the stadia figure lies substantially in the focal plane of the collimating lens 14 whereby the projected image thereof appears to the observer to be at an infinite distance.

The stadia figure generating apparatus 16 comprises a rotatable carriage or turret 17 which is provided with four apertures 18, 19, 20 and 21 into which are inserted four sets of rotatable cooperating stadia figure generating masking plates 22, 23, 24 and 25. When the turret 17 is indexed so as to bring a set of masking plates into an operative position in the focal plane of the collimating lens 14, these plates cooperate with a stationary masking plate 26 to produce a luminous stadia figure comprising a plurality of points of light arranged in the form of a circle, the image of which is projected into the observer's line of sight by reflection from the member 10. The manner in which the masking plates are constructed and operate to produce the stadia figure will now be described in detail.

A set of masking plates, such as set 22, comprises an upper plate or disk 27 and a lower plate or disk 28 which are axially aligned and carried in vertical spaced relation on the rotatable carriage 17. The rotatable carriage 17 is provided with an annular groove 29 which permits the stationary plate 26, which is mounted on some suitable stationary support 30, to extend between the upper and lower plates 27 and 28. It will be assumed in the following description that the carriage 17 has been indexed so that the set 22 of cooperating masking plates is in its operative position as shown in Fig. 5 of the drawings. The plates 26, 27 and 28 will then be superimposed and will constitute a complete set of stadia figure generating masking plates.

The plates 26, 27 and 28 are provided with a series of light conducting portions which are formed, in the embodiment of the invention under present consideration, by cutting slots in the plates. The upper plate 27 is provided with a plurality of spiral slots 31 equally spaced and radially arranged with reference to a central circular aperture 27a. The spiral slots 31 have relatively short radii of curvature so that for a given number of equally spaced slots a line extending radially inward from the outer extremity of any one of the slots intersects a number of adjacent spiral slots at different radial distances.

The stationary plate 26 is provided with a series of radially extending slots 32 and additional slots 26a centrally arranged in the form of a cross to form a reticule image in the line of sight.

The lower plate 28 is provided with the same number of equally spaced spiral slots 33 as plate 27, the slots being also radially arranged with reference to a central circular aperture 28a. The spiral slots 33 have relatively large radii of curvature so that for a given number of equally spaced slots a line extending radially inward from the outer extremity of any one of the slots does not intersect any of the adjacent slots.

As will be explained more fully below, the diameter of the stadia figure formed by the circularly arranged points of light is varied by rotating the upper and lower plates 27 and 28 relative to the stationary plate 26.

In order to rotatably support the upper plate 27 in the rotatable carriage 17 the plate is provided with an upturned flange portion 35 which frictionally engages the inner surface of a ring gear 36 during initial adjustment and after adjustment is permanently secured by any suitable fastening means (not shown). The ring gear 36 is provided with an external portion 37 of reduced diameter which is slidably and rotatably carried in the aperture 18 of the carriage 17. The lower plate 28 is similarly mounted on a second ring gear 38 which is mounted for sliding rotary movement in the carriage 17 in the same manner as the ring gear 36 except that the gear 38 is reversed so that the plates 27 and 28 lie in juxtaposed relation. The ring gears 36 and 38 rotate about an axis passing through the point of intersection of the cross slots 26a and coaxial with the circular apertures 27a and 28a about which the slots 31, 32 and 33 are radially arranged.

Mounted on the upper and lower surfaces of the carriage 17 by suitable fastening means are upper and lower cover plates 39 and 40 provided with circular apertures 39a and 40a to permit passage of light through the sets of masking plates. The upper ring gear 36 is held in its operative position by means of a resilient leaf spring member 41 which is arranged to extend between the cover plate 39 and the top surface of the ring gear. In a similar manner the lower ring gear 38 is held in its operative position by means of a leaf spring 42 which extends between the lower cover plate 40 and the bottom surface of the ring gear. It will be understood that by removing the cover plates 39 and 40 the ring gears 36 and 38 and the attached masking plates 27 and 28 may be removed for repair or adjustment.

The bottom cover plate 40 has integrally formed therewith a downwardly extending sleeve 43 which receives a shaft 44 on which the assembly 16 is mounted. The shaft 44 is journaled in some suitable stationary bearing (not shown). The shaft 44 is secured to the sleeve 43 by means of a pin 45 and it will be understood that by rotating the shaft 44 the assembly 16 may be indexed so as to bring any set of selected masking plates into operative position relative to stationary plate 26.

In order to insure that the rotary carriage will remain in each of its four operative positions, a spring-pressed detent lever 46 is provided. One end of the lever 46 is pivoted to a stationary support 47 while the other end of the lever carries a roller 48. Four notches 49 are placed around the periphery of the carriage 17, the notches being located so that when the carriage is in each operative position the roller 48 drops down into one of the notches and releasably maintains the carriage in the proper position.

The other sets of rotatably mounted masking plates 23, 24 and 25 are constructed in the same manner as the above described set 22 except that the slots therein are arranged to measure the range of different size targets, so that further description of the other sets of plates is deemed unnecessary.

The ring gears 36 and 38 associated with each set of masking plates are all interconnected by means of a gear drive mechanism so arranged that by rotation of a single adjusting shaft all of the rotatably mounted masking plates are rotated and the size of the generated stadia figure correspondingly changed. The mechanism by means of which this is accomplished will now be described.

The carriage 17 is provided with a centrally located hole 50 in which is slidably mounted the lower portion of an adjusting shaft 51. Secured to the shaft 51 and extending outwardly therefrom is an annular member 52 which seats on an upper surface 53 of the carriage 17 and acts to hold the shaft in its operative position. Mounted on the shaft 51 is a spur gear 54 which is arranged to mesh with the upper ring gear 36 of each of the sets of masking plates. The gear 54 is secured to the shaft 51 by means of a pin 55 which extends through both the gear 54 and the annular member 52. The lower end of the shaft 51 carries a pinion 56 which is operatively connected to each of the lower ring gears 38 by means of two intermediate spur gears 57. The intermediate gears 57 are mounted on suitable shafts, one of which is shown at 57a. These shafts are rotatably mounted on the carriage 17.

From the foregoing it will be observed that as the shaft 51 is rotated each set of upper and lower ring gears 36 and 38 will rotate simultaneously therewith. It will also be evident that because of the gear reduction obtained by the use of the pinion 56 and the intermediate gears 57 the lower ring gears 38 rotate at a predetermined slower speed than the upper gears 36. The purpose of this speed differential will be explained more fully below. Attached to the top of the shaft 51 is an adjusting knob 58 by means of which the shaft may be manually rotated to effect an adjustment of the four sets of masking plates.

In order to explain the manner in which the masking plates 26, 27, 28 cooperate to generate a stadia figure comprising a plurality of points of light arranged in a circle, the diameter of which may be varied by relative rotation of the plates, reference will now be made in particular to Figs. 6, 7, 8 and 9 of the drawings.

To facilitate the explanation, the coaction of the stationary plate 26 and the rotatable plate 27 will first be considered. Referring to Fig. 6 of the drawings, it will be noted that each spiral slot in the plate 27 intersects a number of different radial slots in the plate 26 at different radial distances from the center of relative rotation of the plates. Thus for example, the spiral slot 31a in the rotatable plate 27 intersects the radial slots in stationary plate 26 numbered 32a, 32b, 32c, 32d and 32e at the points marked A, B, C, D, and E. The remaining spiral slots 31 intersect the remaining radial slots 32 in a similar manner and it will be apparent that if the plate 28 were omitted there would be produced in the observer's line of sight a luminous stadia figure comprising a plurality of points of light arranged in a series of concentric circles, the radii of which would be equal to OA, OB, OC, OD and OE, where O represents the axis of relative rotation of the plates. It will also be apparent that as the plate 27 is rotated relative to the plate 26 the diameter of each of the concentric circles will be continuously changed due to the spiral shape of the slots 31. This action can be easily seen by a comparison of Figs. 6 and 8 of the drawings. Thus, let it be supposed that the plate 27 is rotated in a counter-clockwise direction from the position shown in Fig. 6 to the position shown in Fig. 8. It will be noted that in Fig. 6 the spiral slot 31a intersects the radial slot 32e at the point E. However, when the plate 27 is rotated counter-clockwise to the position shown in Fig. 8 it will be noted that the spiral slot 31a intersects the radial slot 32e at a greater radial distance as indicated by the point E'. The circle formed by the intersections of the spiral and radial slots indicated as points 69 having a radius OE corresponding to the position of the plates shown in Fig. 6 is illustrated in Fig. 7. When the plate 27 is rotated counter-clockwise to the position shown in Fig. 8 the radius of this same circle will have increased to OE' as indicated in Fig. 9.

In order to secure the desired degree of sensitivity in adjustment of the diameter of a circle formed by the intersecting points of the spiral and radial slots and also for the purpose of securing sharp intersecting points so that the light conducting areas will be small and well defined, it is necessary that the spiral slots 31 have relatively small radii of curvature. As the result of this a given spiral slot intersects a number of radial slots at different radial distances whereby a series of concentric circles is formed, as pointed out above. In order to avoid possible confusion of the observer as to which circle is to be used for stadia measurement it is desirable that all but one of the series of concentric circles be masked out and it is for this purpose that the masking plate 28 is provided. The curvature of the spiral slots 33 is such that as the plate 28 is rotated through a relatively small angular distance relative to the stationary plate 26 the intersection of the slots 33 with the radial slots 32 varies from a small radius corresponding to OE to a relatively large radius corresponding to OE'. This angular movement is necessarily small due to the fact that the slots 33 have a relatively large radii of curvature to avoid multiple intersections by any given slot, as pointed out above. By means of the gear reduction obtained by the use of the above described pinion gear 56 and intermediate gears 57 the speed of the plate 28 is reduced relative to that of the plate 27 so that as the plates are rotated the points of intersection of the spiral slots 33 with the radial slots 32 remain in coincidence with the intersection of the spiral slots 31 and the radial slots 32 forming a predetermined one of the concentric circles formed by the points of intersection of the slots 31 and 32. Since the slots 32 and 33 intersect at but one radial distance all of the other concentric circles are masked out. Because of the fact that the illustrated gear reduction train causes the plates 27 and 28 to rotate in opposite directions the spiral slots 31 and 33 in these plates are curved in opposite directions. Light from the lamp 15 can pass upwardly through the superimposed plates 26, 27 and 28 only at the intersections of the light conducting slots in these plates and it will therefore be apparent that the observer will see but one circle of luminous points. From the foregoing it will also be clear that by turning the knob 58 and rotating the shaft 51 the radius of the circle forming the stadia figure may be varied continuously from OE to OE' or the diameter from 2oe to 2oe'.

The observer also sees superimposed upon the line of sight luminous lines arranged in the form of a reticule cross formed by the light passing through the slots 26a. The circular apertures 27a and 28a permit the passage of light forming the reticule cross through the plates 27 and 28, respectively. The luminous cross assists in a sighting operation in the same manner as the usual cross-hair arrangement.

According to my invention means are also provided for projecting into the line of sight of the observer luminous indicia for indicating to the observer a quantity variable as the function of the size or diameter of the stadia figure. This is accomplished by calibrating the disk or plate 27 in terms of a quantity variable in accordance with the angular displacement of the disk and the corresponding size of the stadia figure such as, for example, target range, and providing slots 60 to indicate the calibration. As illustrated, some stationary reference point, such as the point R, is taken and as the disk 27 is rotated the indicia 60 are arranged so that they project into the line of sight of observer figures which may indicate, as illustrated, target range in yards. The plates 26 and 28 mask out the indicating indicia 60 except when they are in alignment with apertures 61 and 62 which are located in the plates 26 and 28, respectively, adjacent the reference point R.

The remaining sets of masking plates 23, 24 and 25 are provided with slots generally similar in shape to those described in connection with set 22. However, the curvature of the slots varies somewhat in each set so that the indicating indicia 60 on the upper plate of each set accurately indicates range for targets having different known dimensions. Thus, for example, in the illustrated arrangement the four sets of plates 22, 23, 24 and 25 may be calibrated to determine the range of four different types of aircraft having four different predetermined wingspans or other dimensions used for stadia measurement.

If desired, suitable slotted figures may be placed on one of the plates, preferably the slow speed plate 28, to indicate the size of the target the range of which is to be measured by that particular set of plates. For example, such a figure might indicate wingspan of a target airplane.

In using the range finder the observer first determines by recognition of the target the proper set of masking plates to be used in the range determination. The shaft 44 and the attached assembly 16 are then rotated to bring the proper set of masking plates into cooperative relation with the stationary plate 26.

The observer then views the target through the transparent member 10 and sees reflected in the line of sight an image of a luminous stadia figure comprising a plurality of points arranged in the form of a circle and a luminous cross at the center of the circle as pointed out above. Since the masking plates are located in approximately the focal plane of the collimating lens 14 the observed image appears to be at an infinite distance and since it is superimposed upon the line of sight by reflection on the transparent member 10, it appears coincident with the target. The diameter of the circle may be varied from the maximum range position shown in Fig. 7 to the minimum range position shown in Fig. 9 by rotating the plates 27 and 28 relative to the stationary plate 26, which is accomplished by rotating the knob 58. The knob 58 is adjusted by the observer until two diametrically opposite points of the stadia circle are superimposed upon the outermost extremities of a dimension of the target, such as the wingspan of an aircraft 63 as illustrated in Figs. 7 and 9. The luminous indicia 60 will then indicate to the observer the target range. Due to the fact that the areas of the points of light 69 are very small, the amount of light reflected into the eye of the observer is insufficient to interfere with observation of the target even when the general light intensity is low, as at night.

In Figs. 11 and 12 of the drawings I have shown a modified form of the invention utilizing a different form of rotatable masking plate. This modified form of the invention is exactly the same as that described above except the masking plates 27 and 28 have been replaced by the plates 64 and 65 formed of some suitable light-conducting material, such as glass. The plates 64 and 65 are rendered opaque to the transmission of light therethrough by sheets of photographic film 66 which are secured to the adjacent surfaces of the glass plates by any suitable fastening means such as a transparent cement. The sheets 66 may be made by exposing light sensitive film through a suitable negative so constructed that the film will be rendered light conducting, when developed, along spiral paths 67 and 68 having the same curvature as the slots 31 and 33 in the plates 27 and 28. Light is conducted through the superimposed masking plates only at points where the paths 67 and 68 intersect the radial slots 32 in the stationary plate 26 at the same place. It is evident therefore, that the modified arrangement operates in the same manner as the embodiment illustrated in Figs. 1 to 10 inclusive. This arrangement has the advantage that the masking plates can be reproduced more quickly and less expensively than in the case where the plates are rendered light conducting by cutting slots therein.

For the purpose of simplicity in illustration the points 69 forming the stadia figure and the spiral paths 67 and 68 have been indicated as dark points and lines on a light background. It will be understood that in actual practice these points and lines will appear light on a dark background.

While I have shown an arrangement in which one stationary plate 26 is used in connection with all four sets of cooperating masking plates, it will be understood that, if desired, the plate 26 may be secured to the rotary carriage between the relatively rotatable plates and a separate plate 26 provided for each set of plates without departing from my invention.

In the foregoing specification and in the following claims the light conducting portions of the masking plates have been referred to as being "spiral" in shape. I desire it to be understood, however, that the light conducting portions of the masking plates are not necessarily spiral in shape in the strict sense of the word. It will be obvious to those skilled in the art that the contours of the light conducting portions of the plates will vary, depending upon the relation desired between the angular displacement of the rotary masking plates and the corresponding variation in diameter of the stadia figure and that a true spiral is only one of many possible curved shapes of light conducting portions having continuously changing radii of curvature that may be utilized. In use the adjusting shaft 51 may be coupled directly to gun directing apparatus where a range input is desired. In such a case it is usually desirable that there be a fixed relation between the angular displacement of the shaft 51 and the observed range regardless of which set of cooperating masking plates is brought into operative position by rotation of the carriage or turret 17. This can be accomplished by properly designing the shape of the light conducting portions of each set of masking plates.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In an optical sighting device, a transparent member through which a target may be observed, a light projecting system for producing a virtual image of a variable size stadia figure in line of sight of the observer by reflecting an image of said figure on said member, said system comprising a source of light, a collimating lens, and a pair of superimposed opaque masking plates disposed between said source of light and said lens and located in approximately the focal plane of said lens, said masking plates having a series of light conducting portions arranged to intersect and thereby produce a luminous stadia figure comprising a plurality of points of light defining a luminous circle, the diameter of which may be varied by relative movement of said masking plates.

2. In an optical sighting device, a transparent member through which a target may be observed, a light projecting system for producing a virtual image of a variable size stadia figure in the line of sight of the observer by reflecting an image of said figure on said member, said system comprising a source of light, a collimating lens, three superimposed opaque masking plates disposed between said source of light and said lens and located substantially in the focal plane of said lens, the first of said plates having a series of light conducting portions arranged in spirals having relatively small radii of curvature, the second of said plates having a series of radially extending light conducting portions, and the third of said plates having a series of light conducting portions arranged in spirals having relatively large radii of curvature with reference to the spiral portions of the first of said plates, and positive driving means for rotating the first and third of said plates relative to said second plate, the speeds of said first and third plates being so related relative to the spiral light conducting portions of said plates that a luminous stadia figure comprising a plurality of points of light arranged in a single circle is produced at the intersection of the light conducting portions of said plates, the diameter of said stadia figure being variable by a relative rotation of said plates.

3. In an optical sighting device, a transparent member through which a target may be observed, a light projecting system for producing a virtual image of a variable size stadia figure in the line of sight of the observer by reflecting an image of said figure on said member, said system comprising a source of light, a collimating lens, three superimposed opaque masking plates disposed between said source of light and said lens and located substantially in the focal plane of said lens, the first and second of said plates having a series of light conducting portions arranged to intersect at a plurality of points arranged in a series of concentric circles the diameter of which may be varied by relative rotation of said first and second plates, said third plate having light conducting portions arranged to coincide with said points forming a predetermined one of said series of concentric circles whereby a luminous stadia figure comprising a plurality of points of light arranged in a single circle is produced at the intersections of the light conducting portions of all three of said plates, and means for rotating the first and third of said plates relative to the second to vary the diameter of said stadia figure.

4. In an optical range finding device of the type in which the image of a stadia figure is superimposed upon the line of sight of an observed target and the size of the image adjusted so that it coincides with a known dimension of said target, a transparent member through which a target may be observed, a light projecting system comprising a collimating lens for reflecting on said transparent member the image of a stadia figure located in the focal plane of said lens, a plurality of adjustable stadia figures calibrated to determine the range of different size targets, a movable carriage on which said stadia figures are mounted, means for moving said carriage so as to bring selectively said stadia figures into the focal plane of said collimating lens, and a single adjusting member operatively connected to adjust all of the stadia figures mounted on said carriage.

5. In an optical sighting device, a transparent member through which a target may be observed, a light projecting system for producing a virtual image of the variable size stadia figure in the line of sight of the observer by reflecting an image of said figure on said member, said system comprising a source of light, a collimating lens, and a plurality of superimposed opaque masking plates disposed between said source of light and said lens and located approximately in the focal plane of said lens, said masking plates having light conducting portions arranged to intersect and thereby produce a luminous stadia figure the size of which varies in accordance with relative movement of said plates, one of said plates having also light conducting portions forming luminous indicia for indicating to the observer in his line of sight a quantity variable as a function of the size of said stadia figure.

6. In an optical range finder, a transparent member through which a target may be observed, a collimating light projecting system for projecting a reference image into the line of sight of the observer by reflection on said transparent member, said system comprising a collimating lens, a pair of relatively rotatable superimposed plates located in substantially the focal plane of said lens, one of said plates having spiral slots therein and the other of said plates having radial slots therein whereby a stadia figure comprising a plurality of points of light defining a circle is produced at the intersections of said spiral and radial slots, and means for rotating one of said plates relative to the other to vary the diameter of said circle.

7. In an optical range finder, a transparent member through which a target may be observed, a collimating light projecting system for projecting an image of a stadia figure into the line of sight of the observer by reflection on said transparent member, said system comprising a collimating lens, three superimposed opaque masking plates located substantially in the focal plane of said lens, the first of said plates being rotatably mounted and having a plurality of spiral slots therein, the second of said plates being stationary and having radial slots therein, said spiral and radial slots being arranged to intersect at a plurality of points arranged in a series of concentric circles the diameter of which is continuously variable by rotation of said first plate, said third plate being rotatably mounted and having a plurality of spiral slots therein arranged to coincide with said points forming a predetermined one only of said concentric circles, and positive driving means interconnecting said first and third plates, said driving means having a speed ratio such that as said first plate is rotated said third plate is rotated at a speed to maintain the spiral slots therein in coincidence with said points forming said predetermined one of said circles, whereby a stadia figure is produced comprising a plurality of points of light at the intersections of the slots in all three of said plates, said points being arranged in a circle the diameter of which may be varied by rotation of said first and third plates.

8. In an optical sighting device, a light projecting system for projecting an image of a stadia figure of variable size comprising a collimating lens, a pair of relatively rotatable superimposed plates located in substantially the focal plane of said lens, one of said plates having spiral slots therein and the other of said plates having radial slots therein whereby a stadia figure comprising a plurality of points of light defining a circle is produced at the intersections of said spiral and radial slots, and means for rotating one of said plates relative to the other to vary the diameter of said circle.

9. In an optical sighting device, a light projecting system for projecting an image of a stadia figure of variable size comprising a collimating lens, three superimposed masking plates located substantially in the focal plane of said lens, the first of said plates being rotatably mounted and having a plurality of spiral slots therein, the second of said plates being stationary and having radial slots therein, said spiral and radial slots being arranged to intersect at a plurality of points arranged in a series of concentric circles the diameter of which is continuously variable by rotation of said first plate, said third plate being rotatably mounted and having a plurality of spiral slots therein arranged to coincide with said points forming a predetermined one only of said concentric circles, and positive driving means interconnecting said first and third plates, said driving means having a speed ratio such that as said first plate is rotated said third plate is rotated at a speed to maintain the spiral slots therein in coincidence with said points forming said predetermined one of said circles whereby a stadia figure is produced comprising a plurality of points of light at the intersections of the slots in all three of said plates, said points being arranged in a circle the diameter of which may be varied by rotation of said first and third plates.

10. In an optical sighting device, a light projecting system comprising a collimating lens, a source of light, a plurality of superimposed opaque masking plates disposed between said source of light and said lens and located approximately in the focal plane of said lens, said masking plates having light conducting portions arranged to intersect and thereby produce a luminous stadia figure the size of which varies in accordance with the relative movement of said plate, one of said plates having also light conducting portions forming luminous indicia for indicating to the observer in his line of sight a quantity variable as a function of the size of said stadia figure.

11. In an optical sighting device, a light projecting system comprising a collimating lens, a source of light, and a pair of superimposed opaque masking plates disposed between said source of light and said lens and located in substantially the focal plane of said lens, one of said plates having a series of spiral light conducting slots and the other of said plates having a series of radial light conducting slots whereby a luminous stadia figure comprising a plurality of points of light defining a circle is produced at the intersections of said spiral and radial light conducting slots of said plates, and means for rotating one of said plates relative to the other whereby to vary the diameter of said stadia figure.

12. In an optical sighting device, a light projecting system comprising a collimating lens, a source of light, means located between said source of light and said lens for producing a stadia figure of variable size, said means comprising a supporting member, a pair of vertically spaced coaxially aligned ring gears rotatably mounted on said member, a pair of juxtaposed rotatable masking plates having spiral light conducting portions, each of said gears carrying one of said plates so that said plates are superimposed, a stationary masking plate having radial light conducting portions disposed between said rotatable masking plates, a rotatable adjusting shaft carried on said supporting member, and mechanism comprising a system of gears interconnecting said shaft and said ring gears, said mechanism being arranged so that upon rotation of said shaft said rotatable plates rotate relative to each other and to said stationary plates whereby to produce a variable size stadia figure comprising a plurality of points of light arranged in a single circle.

13. In an optical sighting device, a light projecting system comprising a collimating lens, a source of light, and means located between said source of light and said lens for producing a stadia figure of variable size, said means comprising a rotatable carriage having an annular groove therein, a plurality of pairs of ring gears rotatably mounted on said carriage, a plurality of pairs of juxtaposed rotatable masking plates, one of each pair of plates being carried on one of each pair of said gears so as to provide a plurality of sets of relatively rotatable plates, one of each set being located on each side of said groove, a stationary masking plate disposed in said groove so that upon rotation of said carriage a selected one of said sets of masking plates can be brought into vertical alignment with said stationary plate, a rotatable adjusting shaft mounted on said carriage, and mechanism comprising a system of gears interconnecting said shaft and each of said ring gears, said mechanism being arranged so that upon rotation of said shaft one of each pair of said ring gears and its associated masking plate is rotated relative to the other and to said stationary masking plates.

14. In an optical sighting device, a light projecting system comprising a collimating lens, a source of light, and three superimposed opaque masking plates disposed between said source of light and said lens and located substantially in the focal plane of said lens, the first of said plates having a series of light conducting portions arranged in spirals having relatively small radii of curvature, the second of said plates having a series of radially extending light conducting plates, and the third of said plates having a series of light conducting portions arranged in spirals having relatively large radii of curvature with reference to the spiral portions of the first of said plates so that a luminous stadia figure comprising a plurality of points of light arranged in a circle is produced at the intersection of the light conducting portions of said plates, the diameter of said stadia figure being variable by relative movement of said masking plates.

CHARLES S. GRIMSHAW.